(12) United States Patent
Henry et al.

(10) Patent No.: US 9,543,772 B2
(45) Date of Patent: Jan. 10, 2017

(54) SHORT CIRCUIT PROTECTION FOR A PORTABLE DEVICE POWERED BY A BATTERY PACK HAVING UNDERVOLTAGE PROTECTION

(71) Applicant: MOTOROLA SOLUTIONS, INC, Schaumburg, IL (US)

(72) Inventors: David Henry, Miramar, FL (US); Branko L Avanic, Miami, FL (US); Wayne M Phang, Coral Springs, FL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 163 days.

(21) Appl. No.: 14/465,045

(22) Filed: Aug. 21, 2014

(65) Prior Publication Data

US 2016/0056623 A1 Feb. 25, 2016

(51) Int. Cl.
*H02J 7/00* (2006.01)
*H02H 7/18* (2006.01)

(52) U.S. Cl.
CPC ............... *H02J 7/0044* (2013.01); *H02H 7/18* (2013.01)

(58) Field of Classification Search
CPC ...... H02J 7/0008; H02J 7/0013; H02J 7/0044; G01R 31/3658; H02H 9/02; H01L 27/0288; H01M 10/4221; H01M 10/44; H01T 4/08

See application file for complete search history.

(56) References Cited

U.S. PATENT DOCUMENTS

| | | | |
|---|---|---|---|
| 3,648,145 A * | 3/1972 | Meyer | H02H 11/006 320/136 |
| 3,686,530 A | 8/1972 | Bogut | |
| 5,504,411 A | 4/1996 | McCaleb et al. | |
| 5,905,358 A * | 5/1999 | Fernandez | H02J 7/0008 320/106 |
| 7,609,005 B2 | 10/2009 | West | |
| 2004/0157116 A1 | 8/2004 | Perkins et al. | |
| 2006/0220069 A1 | 10/2006 | Cole et al. | |
| 2007/0103833 A1 | 5/2007 | Harris | |
| 2008/0309287 A1* | 12/2008 | Reed | H01F 38/14 320/108 |
| 2013/0179012 A1 | 7/2013 | Hermann et al. | |
| 2015/0318274 A1* | 11/2015 | Deng | H01L 27/0288 361/93.4 |

* cited by examiner

*Primary Examiner* — Vuthe Siek
(74) *Attorney, Agent, or Firm* — Barbara R. Doutre; Scott M. Garrett

(57) ABSTRACT

A portable device includes set of charger contacts and a set of battery contacts. The battery contacts mate with corresponding contacts of a battery pack used to power the portable device, and the charger contacts allow charging of the battery pack while connected to the portable device. The battery pack includes an undervoltage protection circuit that opens when an undervoltage condition occurs across the battery pack contacts. The portable device further includes short circuit protection element connected between corresponding contacts of the set of battery contacts and the set of charger contacts that, upon a short circuit condition occurring at the charger contacts, prevents the undervoltage protection circuit from tripping and opening.

11 Claims, 3 Drawing Sheets

SHORT CIRCUIT PROTECTION FOR A PORTABLE DEVICE POWERED BY A BATTERY PACK HAVING UNDERVOLTAGE PROTECTION

FIELD OF THE DISCLOSURE

The present disclosure relates generally to battery powered portable devices, and more particularly to portable devices that have external charger contacts to allow charging of a battery housed within the portable device and where the battery contains undervoltage protection circuitry.

BACKGROUND

It is common to design portable devices with an enclosed battery compartment, or with means for attaching a battery pack (or simply "battery") to the portable device. In many devices the battery can be recharged either by removing the battery and placing the battery in a charger, by connecting the portable device to a charger, or in some cases, placing the portable device with the battery together into a charger.

Many portable devices, such as, for example, portable two-way radio devices and accessories, are designed to be operated by personnel wearing gloves. As such having to take a small, handheld device apart to remove a battery for charging, or connecting a cable to a small connector (e.g. micro USB) is not optimal. Accordingly, such devices are often designed to have prominent charger contacts on a surface of the device so that the device including the battery can easily be placed into a charger without need for fine manipulations. However, such exposed contact can present an opportunity for contact with electrically conductive items, potentially creating a short circuit between the positive and negative charger contacts. When this occurs, if it occurs, an undervoltage protection circuit in the battery can open an undervoltage switch, removing power from the device. Typically, the undervoltage switch will remain opened, even though the short circuit is removed from the charger contacts, due to the load presented by circuitry in the device. When this occurs, the battery must be momentarily removed from the device in order to reset the protection circuitry. Cleary, having to remove the battery from the device to reinstate battery operation can be considerably inconvenient, particularly if the device is a portable two-way radio device being used by a public safety operator.

Accordingly, there is a need for a way to prevent short circuit conditions from tripping protection circuitry in the battery while still preventing a short circuit from interrupting device operation.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
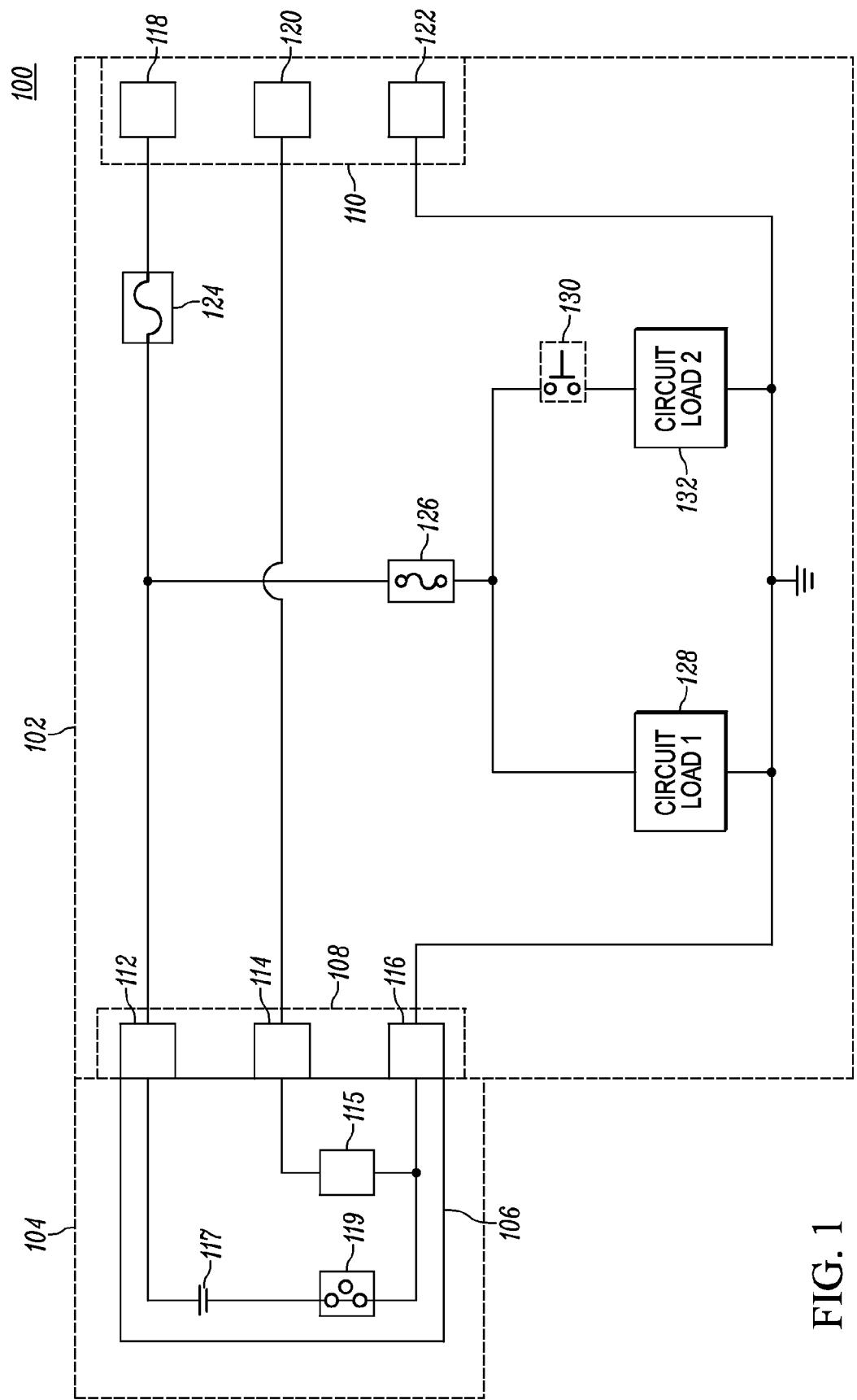
FIG. 1 is a block diagram of portable device system having short circuit protection, in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Embodiments of the disclosure include a portable device that includes a set of battery contacts having a positive battery contact and a negative battery contact. The portable device further includes a set of charger contacts having a positive charger contact corresponding to the positive battery contact and defining a first pair of corresponding contacts, a negative charger contact corresponding to the negative battery contact and defining a second pair of corresponding contacts. The portable device further includes a short circuit protection element electrically coupled between a charger contact and a battery contact in at least one pair of the first and second pairs of corresponding contacts.

Embodiments can further include a portable device system that includes a portable device and a battery pack for powering the portable device. The portable device includes a battery interface including a set of battery contacts having a positive battery contact and a negative battery contact. The portable device further includes a set of charger contacts having a positive charger contact corresponding to the positive battery contact and defining a first pair of corresponding contacts. The portable device further includes a negative charger contact corresponding to the negative battery contact and defining a second pair of corresponding contacts. A short circuit protection element is electrically coupled between a charger contact and a battery contact in at least one pair of the first and second pairs of corresponding contacts. The battery pack is configured to be coupled to the battery contacts of the portable device, and includes at least one battery cell and an undervoltage protection circuit which opens a switch in series with the at least one battery cell in response to a load that would cause a voltage of the at least one battery cell to fall below an undervoltage threshold.

FIG. 1 is a block diagram of portable device system 100 having short circuit protection, in accordance with some embodiments. The system 100 includes a portable device 102 which includes a battery hosting site 104 which can host a rechargeable battery pack 106. The battery pack 106 is connected to a set of battery contacts 108 of the device 102. The device further includes a set of charger contacts 110. The set of battery contacts 108 mate with a set of corresponding contacts on the battery back 106, and include a positive battery contact 112 and a negative battery contact 116, between which a battery voltage is provided. The set of battery contacts 108 can further include an auxiliary battery contact 114. The auxiliary battery contact 114 allows access to auxiliary circuitry 115 in the battery pack 106 that provides information about the battery pack 106, such as, for example, a memory device that stores battery data, a thermistor for sensing temperature, or any other such circuit. The set of battery contacts 108 are located in the battery hosting site 104 such that when the battery pack 106 is connected to the device 102, the set of battery contacts 108 are covered and not exposed. In some embodiments the battery hosting site 104 can be a battery compartment formed in the device 102, which can be covered by a battery cover, as is well known. As the battery pack 106 may be inaccessible while mounted in the device 102, the device 102 includes the set of charger contacts 110 to allow charging of the battery pack 106 while the battery pack 106 is mounted to the device 102. Accordingly, the set of charger contacts 110 includes a positive charger contact 118 and a negative charger contact 122. A charger (not show) provides a charging current through the positive charger contact 118, through the device 102 (i.e. a conductor) to the positive battery contact 112 and through a battery cell 117 (or cells) in the battery pack 106. The charging current returns through the negative battery contact 116 through the device 102 to the negative charger contact 122. The set of charger contacts 110 can also include an auxiliary charger contact 120 that is connected to the auxiliary battery contact 114 to allow a charger access to the auxiliary circuit in the battery pack 106. The set of charger contacts 110 is disposed on an external surface of the device 102 to allow the device 102 to be inserted into a charger pocket where contacts of the battery charger mate with their corresponding contacts of the set of charger contacts 110. As such, the set of charger contacts are exposed when the device is not inserted or otherwise connected to a battery charger.

The device 102 further includes device circuitry that is powered by the battery pack 106. As is common, there can be several sub-systems of circuitry, which can be represented, for example, as a first circuit load 128 and a second circuit load 132. The circuitry can be protected by a fuse 126. In some embodiments the device 102 can be a two-way portable radio device that includes a power up button 130 that activates a radio circuit (e.g. the second circuit load 132) to transmit voice signals when pressed.

The battery pack 106 can include a battery protection circuit 119 that is connected in series with the battery cell(s) 117. The battery protection circuit includes one or more transistor switch elements that are normally closed, and which are opened by detection circuitry that detects overvoltage and undervoltage conditions. An overvoltage condition occurs when the battery voltage rises above an overvoltage threshold, as can occur if the battery cell(s) 117 are overcharged or the charger is operating improperly. Similarly, and undervoltage condition occurs when the battery voltage falls below an undervoltage threshold, which can occur, for example, if the battery terminals are short-circuited.

While the battery pack 106 is mounted in the device 102, since the contacts of the set of charger contacts 110 are exposed on an external portion of the device 102, it is possible that some conductor could come in contact with both the positive and negative charger contacts 118, 122, resulting in a short circuit. To prevent tripping the protection circuit 119 in the battery pack 106 (which would require removal of the battery pack 106 from the device 102 to reset), a short circuit protection element 124 is connected between the positive charger contact 118 and the positive battery contact 112. The short circuit protection element 124 is a circuit or component that will prevent the protection circuit 119 from being triggered and opening, necessitating removal of the battery 106 from connection with the device 102 to reset the protection circuit 119, when a short circuit or other load sufficient to trigger the protection circuit is applied to the charger contacts 118, 122. Although shown here between the positive charger and positive battery contacts 118, 112, respectively, the short circuit protection element 124 can also be placed between the negative charger contact 122 and the negative battery contact 108. Furthermore, the location of the short circuit protection element 124, electrically, is between the point where device circuitry (i.e. first and second circuits 128, 132) connects to the battery and the charger contact so that the short circuit protection element 124 does not interfere with operation of the device circuitry.

Figure 2:
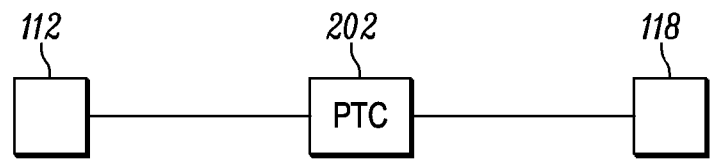
FIG. 2 is a block diagram of a short circuit protection circuit for a portable device, in accordance with some embodiments.

FIG. 2 is a block diagram of a short circuit protection circuit 200 for a portable device, in accordance with some embodiments. The short circuit protection circuit 200 is an example of an implementation of the short circuit protection element 124 of FIG. 1. In the present example the short circuit protection element is a polymeric positive temperature coefficient (PTC) device 202, such as those sold under the trade name "PolySwitch." A PTC device operates in response to self-heating, which occurs generally at a specified electric current level. When a current passes through the PTC device that exceeds the threshold, the polymeric material changes its electrical property from being highly conductive to highly resistive in a short activation time, and thus operates like a resettable fuse. The PTC device 202 can be connected between the negative battery and charger terminals or contacts (i.e. 116, 122) as well. The PTC device 202 can respond to high current and short circuit conditions between the charger positive and negative terminals 118, 122 faster than the protection circuit (i.e. 119) in the battery pack can respond to the resulting undervoltage condition. Once the PTC device 202 transitions from a closed to an open condition, any undervoltage condition at the battery pack will be eliminated, preventing the protection circuit from being triggered (i.e. opening the protection switch). That is, the PTC device 202 has an activation time that is shorter than an activation time of the undervoltage protection circuit, thus the PTC device 202 responds before the undervoltage protection circuit, thereby preventing activation of the undervoltage protection in the battery pack. The PTC device 202 can be designed such that the current threshold at which it transitions from a low impedance to a high impedance is above that used to charge the battery.

Figure 3:
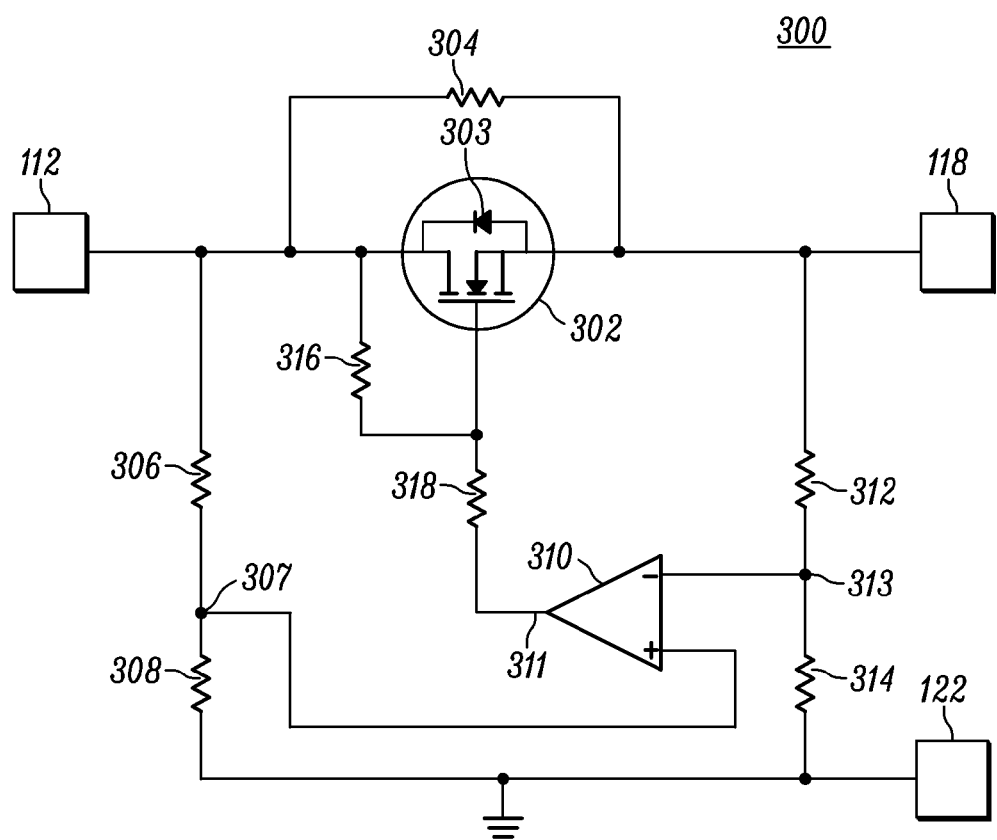
FIG. 3 is a block diagram of a short circuit protection circuit for a portable device, in accordance with some embodiments.

FIG. 3 is a block diagram of a short circuit protection circuit 300 for a portable device, in accordance with some embodiments. The circuit 300 uses a semiconductor solution to address heavy loading and short circuit events between the charger positive and negative contacts 118, 122. In particular, as exemplified here, the circuit 300 uses a P-type metallic oxide field effect transistor (MOSFET) 302 connected between the positive battery contact 112 and the positive charger contact 118, with the source terminal of the MOSFET 302 connected to the positive charger contact 118 and the drain terminal of the MOSFET 302 connected to the positive battery contact 112. The MOSFET 302 has an inherent body diode 303 having an anode connected to the source terminal and the positive charger contact 118 and a cathode connected to the drain terminal and the positive battery contact 112. A resistor 304 is coupled in parallel with the MOSFET 302. A pull-up resistance 316 is coupled between the drain and gate terminals of the MOSFET 302. A drive resistor 318 is connected between the output 311 of a comparator 310 and the gate terminal of the MOSFET 302. The drive resistor 318 can have a much lower resistance than the resistance of the pull-up resistor 316 so that when the output 311 of the comparator 310 is low, the voltage at the gate terminal of the MOSFET 302 is a small fraction of the voltage at the drain terminal due to voltage division between the pull-up resistor 316 and the drive resistor 318. In some embodiments the drive resistor 318 can have a resistance that is 1/10th that of the resistance of the pull-up resistor 316, or less. The comparator 310 uses the output of a pair of voltage dividers for inputs. A first voltage divider comprised of resistors 306 and 308 produce a voltage at node 307, and are connected in series between the positive battery contact 112 and ground (i.e. the negative battery contact 116 and negative charger contact 122), on the drain terminal side of MOSFET 302. The voltage at node 307 is provided to the non-inverting input of the comparator 310. Another voltage divider comprised of resistors 312 and 314 are connected in series between the positive charger contact 118 and ground, on the source terminal side of the MOSFET 302, and being joined at node 313. The voltage at node 313 is provided to the inverting input of comparator 310.

When the battery is present in the device and the device is not connected to a charger, there is no voltage source applied to the positive charger contact 118. Thus, the voltage of the battery at positive battery contact 112 is divided across resistors 304, 312, and 314, and across resistors 306 and 308. The values of the various resistors can be selected such that, when no voltage source is present at the positive charger contact 118, the voltage at node 313 will lower than the voltage at node 307, making the voltage at the non-inverting input of the comparator higher than the voltage at the inverting input, and as a result, the output 311 of the comparator 310 will be high, causing the MOSFET 302 to be off (i.e. in a high impedance state), and current from the positive battery contact 112 will be blocked by the MOSFET 302. If the positive battery contact 118 is shorted to the negative charger contact 122, the voltage at node 313 will be ground, and the output 311 of the comparator 310 will remain high. Thus, with no voltage source at the positive charger contact 118, the MOSFET 302 prevents any short circuit or other load condition from causing an undervoltage condition at the battery.

When a voltage is applied to positive charger contact 118, such as a charger voltage, it will be equal to, or higher than the battery voltage at the positive battery contact 112, and as a result, the voltage at node 313 can be higher than the voltage at node 307. In fact, resistor 312 can be a zero Ohm connection. Thus, the voltage at the inverting input of the comparator 310 will be higher than the voltage at the non-inverting input, causing the output 311 to go low, which will cause the MOSFET 302 to turn on (i.e. a low impedance state), which will allow current to flow into the battery from the charger.

Figure 4:
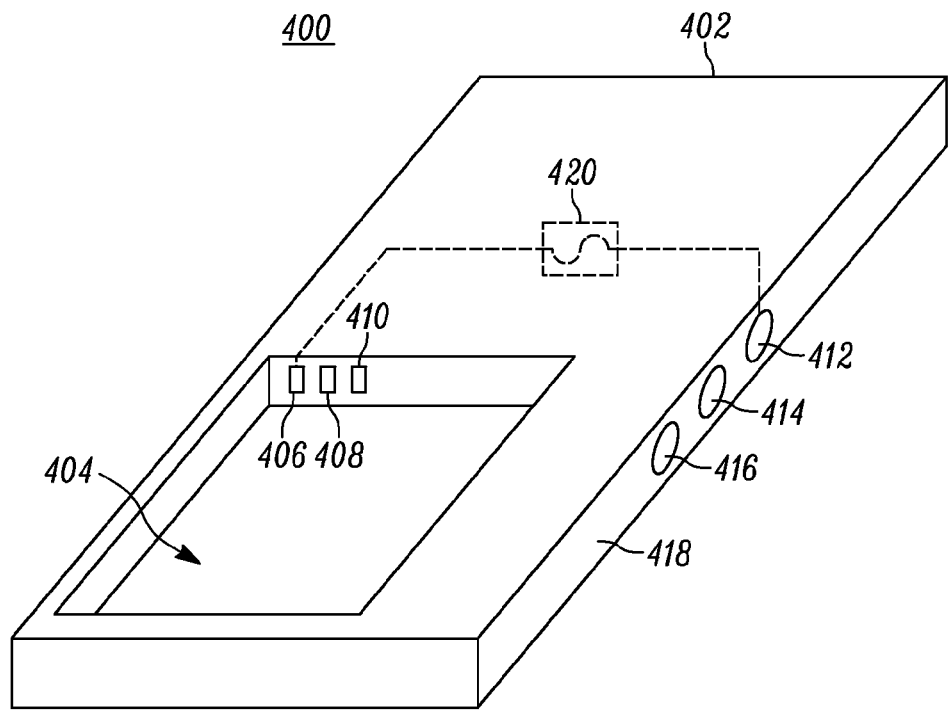
FIG. 4 is an isometric view of a portable device, in accordance with some embodiments.

FIG. 4 is an isometric view 400 of a portable device 402, in accordance with some embodiments. The device 402 can be substantially similar to that shown in FIG. 1, and in some embodiments can be a portable two-way radio device. In some embodiments the portable two-way radio device can a portable two-way radio. In some embodiments the portable two-way radio device can be remote speaker and microphone accessory for a portable two-way radio. A portable two-way radio is a handheld communication device that provides "push to talk" (PTT) radio communication. PTT operation involves an operator pressing a PTT button, which activates a microphone of the device, and causes audio signals generated by the microphone to be transmitted via modulated radio carrier signals.

The device includes a battery compartment 404, into which a battery can be inserted. In the battery compartment 404, a battery interface of the device 402 includes a positive battery contact 406, an auxiliary battery contact 408, and a negative battery contact 410. Additional contacts may be provided in some embodiments, and the auxiliary battery contact 408 may be omitted in some embodiments. The device further provides a set of charger contacts on an exterior surface 418 of the device 402, including a positive charger contact 412, an auxiliary charger contact 414, and a negative charger contact 416. Each contact in the set of charger contacts can be substantially flat, and coplanar with the surface 418 on which they are disposed in some embodiments. A short circuit protection element 420 can be connected between the positive charger contact 412 and the positive battery contact 406. In some embodiments the battery compartment can be covered by a cover piece (not shown) to retain a battery in the battery compartment 404.

In some embodiments a battery pack can be mounted on the device, such as on a back side of the device, and retained by mechanical retaining features, such as a latch. In such embodiments a set of battery contacts are disposed on the mating surface of the device, and are covered by the battery pack upon the battery pack being mounted on the device.

Figure 5:
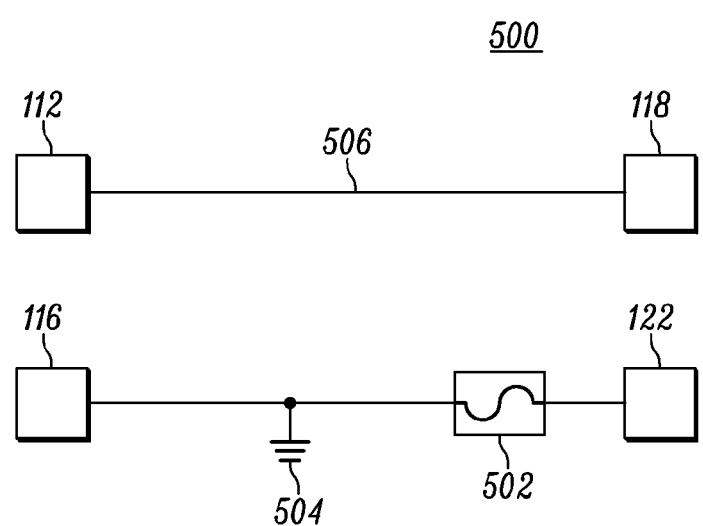
FIG. 5 is a block diagram of a short circuit protection circuit for a portable device, in accordance with some embodiments.

FIG. 5 is a block diagram of a short circuit protection circuit 500 for a portable device, in accordance with some embodiments. The circuit 500 shows an example of an implementation where the short circuit protection element 502 is connected between the negative battery contact 116 and the negative charger contact 122. The ground 504 is referenced at the node between the short circuit protection element 502 and the negative battery contact 116. The positive battery contact 112 can be directly connected to the positive charger contact 118 with substantially no electrical impediment between the positive contacts 112, 118.

Accordingly, embodiments as disclosed herein provide the benefit of eliminating the need to remove a battery having undervoltage protection from a device which it powers in the event of a short circuit or other substantial load at the external charger contacts. The use of a short circuit protection element further provides the benefit of minimizing, if not eliminating, a high current event sourced at the charger contacts, which can reduce the risk of ignition of matter in contact with, or substantially near the charger contacts in the event of a short circuit condition.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. For example, the comparator 310 of FIG. 3 can be replaced by an input/output (I/O) terminal of a processor, where the processor receives input regarding the voltages at nodes 307, 313. Software can be used to perform a comparison of voltage inputs provided by nodes 307, 313 and the state of the I/O controlled accordingly. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A portable device, comprising:
   a set of battery contacts including a positive battery contact and a negative battery contact;
   a set of charger contacts including a positive charger contact corresponding to the positive battery contact and defining a first pair of corresponding contacts, a negative charger contact corresponding to the negative battery contact and defining a second pair of corresponding contacts; and
   a short circuit protection element comprising a transistor switch circuit electrically coupled between a charger contact and a battery contact in at least one pair of the first and second pairs of corresponding contacts, wherein the transistor switch circuit comprises:
      a transistor coupled between the at least one pair of the first and second pairs of corresponding contacts;
      a diode and a resistor each disposed in parallel with the transistor; and
      a comparator circuit that turns the transistor on when the portable device is coupled to a charger based on voltage applied by the charger across the positive and negative charging contacts and maintains the transistor turned off otherwise.

2. The portable device of claim 1, wherein the set of battery contacts are disposed in a battery compartment of the portable device.

3. The portable device of claim 1, wherein the each contact of the set of charger contacts are disposed on an external surface of the portable device.

4. The portable device of claim 3, wherein each contact of the set of charger contacts comprises a flat surface that is coplanar to the external surface of the portable device.

5. The portable device of claim 1, further comprising device circuitry coupled between the positive and negative battery contacts.

6. A portable device system, comprising:
   a portable device having a battery interface including a set of battery contacts having a positive battery contact and a negative battery contact, a set of charger contacts having a positive charger contact corresponding to the positive battery contact and defining a first pair of corresponding contacts, a negative charger contact corresponding to the negative battery contact and defining a second pair of corresponding contacts, and a short circuit protection element comprising a polymeric positive temperature coefficient device electrically coupled between a charger contact and a battery contact in at least one pair of the first and second pairs of corresponding contacts; and a battery pack configured to be coupled to the battery contacts of the portable device including at least one battery cell and an undervoltage protection circuit which opens a switch in series with the at least one battery cell in response to a load that would cause a voltage of the at least one battery cell to fall below an undervoltage threshold, and wherein the short circuit protection element comprising the polymeric positive temperature coefficient device of the portable device has an activation time that is less than an activation time of the undervoltage protection circuit of the battery pack.

7. A portable device system, comprising:

a portable device having a battery interface including a set of battery contacts having a positive battery contact and a negative battery contact, a set of charger contacts having a positive charger contact corresponding to the positive battery contact and defining a first pair of corresponding contacts, a negative charger contact corresponding to the negative battery contact and defining a second pair of corresponding contacts, and a short circuit protection element comprising a transistor switch electrically coupled between a charger contact and a battery contact in at least one pair of the first and second pairs of corresponding contacts; and a battery pack configured to be coupled to the battery contacts of the portable device including at least one battery cell and an undervoltage protection circuit which opens a switch in series with the at least one battery cell in response to a load that would cause a voltage of the at least one battery cell to fall below an undervoltage threshold; and wherein the short circuit protection element comprising the transistor switch circuit comprises:

a transistor coupled between the at least one pair of the first and second pairs of corresponding contacts;

a diode and a resistor each disposed in parallel with the transistor; and a comparator circuit that turns the transistor on when the portable device is coupled to a charger based on voltage applied by the charger across the positive and negative charger contacts and maintains the transistor turned off otherwise.

8. The portable device system of claim 7, wherein the each contact of the set of charger contacts are disposed on an external surface of the portable device.

9. A portable two-way radio device, comprising:

a battery compartment configured to accept a battery pack having an undervoltage protection circuit;

a set of battery contacts in the battery compartment having a positive battery contact and a negative battery contact;

a set of charger contacts disposed on an external surface of the portable two-way radio device and having a positive charger contact corresponding to the positive battery contact and defining a first pair of corresponding contacts, a negative charger contact corresponding to the negative battery contact and defining a second pair of corresponding contacts; and a short circuit protection element electrically coupled between a charger contact and a battery contact in at least one pair of the first and second pairs of corresponding contacts, wherein the short circuit protection element prevents the undervoltage protection circuit in the battery pack from opening in the event of a short circuit condition between the positive charger contact and the negative charger contact.

10. The portable two-way radio device of claim 9, wherein the short circuit protection element is a polymeric positive temperature coefficient device.

11. The portable two-way radio device of claim 9, wherein the short circuit protection element is disposed between the positive charger contact and the positive battery contact.

* * * * *